UNITED STATES PATENT OFFICE.

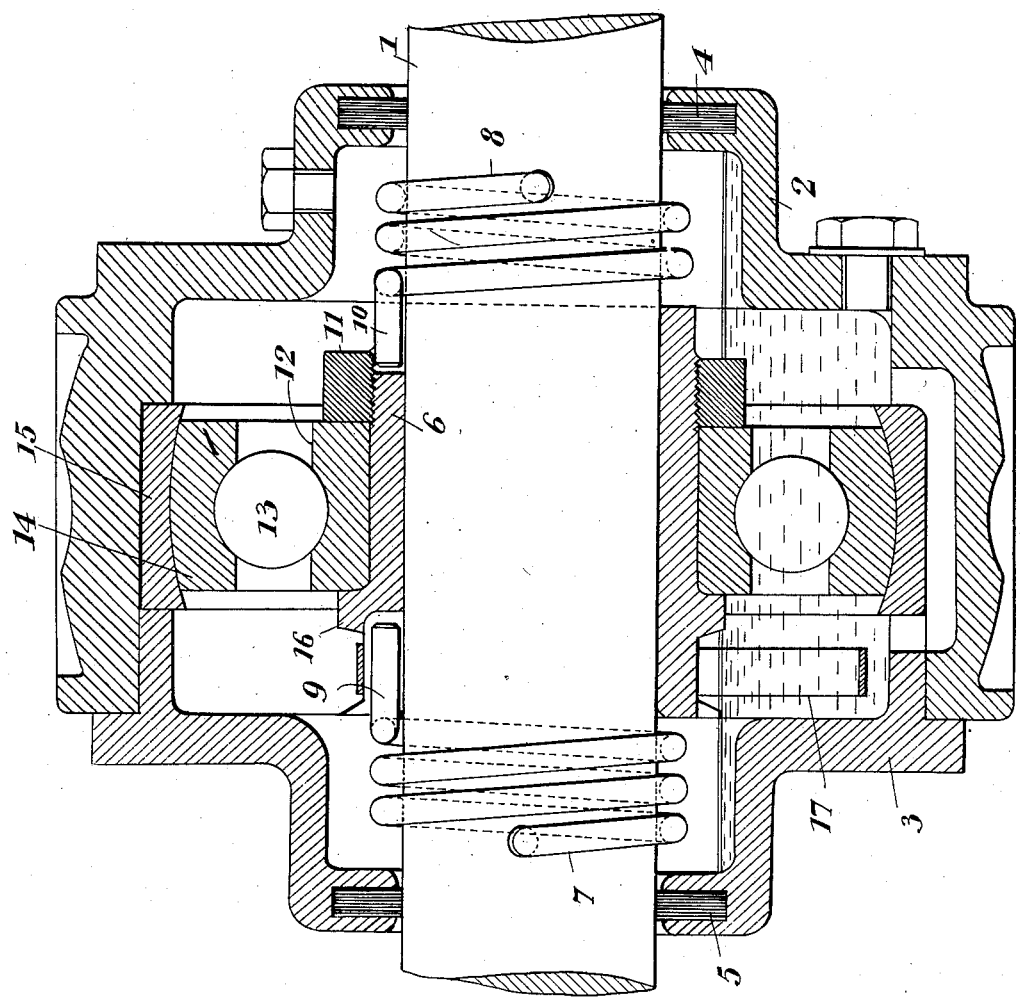

CÉLESTIN DELMEZ, OF ANTWERP, BELGIUM.

BALL-BEARING.

1,094,312.

Specification of Letters Patent.

Patented Apr. 21, 1914.

Application filed July 17, 1913. Serial No. 779,571.

*To all whom it may concern:*

Be it known that I, CÉLESTIN DELMEZ, a subject of the King of Belgium, and a resident of Antwerp, Belgium, have invented certain new and useful Improvements in Ball-Bearings, of which the following is a specification.

The application No. 779570 filed July 17, 1913 relates to a lubricator box with ball bearings for being used in connection with tramway and rail road vehicles and in which a sleeve, engaged around the axle journal and carrying the ball bearing rotates on said journal and smoothly slides on same in the axial direction in order to remove the noxious effects resulting from the eccentrically and axially directed strains which cause twisting of the parts. Such lubricator boxes may be applied to shaftings and with this object in view improvements have been provided which form the object of the present invention.

The improvements consist in that the yielding connection between the sleeve and the axle or shaft is no more obtained by means of a bolt secured on the journal or shaft, and engaging a corresponling slot on the sleeve, but by one or more helical springs surrounding the shaft, and having one end secured to said shaft while the opposite end engages corresponding boxes provided at the end of said sleeve, thus forming a resilient connection between sleeve and shaft.

The rotation may be a right side one or a left side one according to the position of the spring when a single spring is used. When making use of two springs, both directions of rotation may be provided.

The invention is shown in the accompanying drawing, which is an axial section of a lubricator box mounted on a usual shaft, two springs being provided.

On a shaft 1 is mounted a lubricator box 2 provided with a ball bearing and closed by a lateral cover 3 tightly secured to same. Stuffing boxes 4. 5 are provided on said box and cover in order to prevent any leakage of oil.

A sleeve 6 smoothly surrounds the shaft 1 and on the opposed ends of said sleeve 6 are provided helical springs 7. 8, one end of which is secured on the shaft 1 while the opposite free end is bent in the axial direction and engages a bore provided at the corresponding end of the sleeve and having a larger diameter than that of the spring so that the free end of the latter may freely move within said bore. A resilient connection is thus provided between the sleeve 6 and the shaft 1, so that the sleeve is carried with the rotating shaft and freely slides on the latter in order to compensate the noxious axial and eccentric strains.

In order to readily engage the sleeve 6 on the shaft, it is longitudinally slit so that it may be conveniently slit over the peripherical irregularities of the milled shaft.

On the sleeve 6 is mounted the inner ball race 12 of the balls 13. One end of said ring 12 bears against a flange 16 of the sleeve 6 while it is secured to the latter by means of a nut 11 engaging the threaded end of the sleeve. The outer ball race 14 has a spherical outer periphery maintained by a correspondingly shaped ring 15 which is firmly secured between a flange of a box 2 and an extension of the cover 3.

17 is a lubricating ring.

The spring (or springs) connecting the sleeve with the shaft cause the sleeve to be yieldingly carried with the shaft, so that any shock is avoided while starting, and they continuously bring the sleeve back in its usual position while the movements of same are very smooth ones.

Having now fully described my said invention what I claim and desire to secure by Letters Patent, is:

1. In an anti-friction bearing, the combination of a box, a shaft mounted in the box, a sleeve in the box and slidably mounted on the shaft, ball bearings supported on the sleeve, and springs secured to the shaft and to the sleeve.

2. In an anti-friction bearing, the combination of a box, a shaft mounted in the box, a sleeve in the box, and slidably mounted on the shaft, one end of said sleeve having a flange and a notch and the opposite end being threaded and formed with a notch, coil springs mounted on the shaft opposite each end of the sleeve, one end of each of said springs being secured to the shaft and the opposite end engaging in one of the notches in the sleeve, a ball race member mounted on the sleeve and bearing against the flange, a nut engaging the threaded end of the sleeve and engaging the ball race member, balls mounted on the ball race, an outer ball race member engaging the balls, the outer surface of the outer ball race being convex, and an annulus having an inner concave surface in which the convex surface of the outer ball race fits.

In testimony whereof I have hereunto set my hand in presence of two witnesses.

CÉLESTIN DELMEZ.

Witnesses:
G. DEHER,
N. LEE SPRUN.